(12) United States Patent
Kowalski et al.

(10) Patent No.: US 10,060,503 B2
(45) Date of Patent: Aug. 28, 2018

(54) REDUCED NOISE FLEXPLATE

(71) Applicant: Magna Powertrain, Inc., Concord (CA)

(72) Inventors: Andrzej Kowalski, Toronto (CA); Gunter R. Ladewig, Maple (CA); Georges Issa, Richmond Hill (CA); Dusan Milacic, Toronto (CA)

(73) Assignee: MAGNA POWERTRAIN, INC., Concord (CA)

(*) Notice: Subject to any disclaimer, the term of this patent is extended or adjusted under 35 U.S.C. 154(b) by 412 days.

(21) Appl. No.: 14/820,625

(22) Filed: Aug. 7, 2015

(65) Prior Publication Data
US 2016/0069416 A1 Mar. 10, 2016

Related U.S. Application Data

(60) Provisional application No. 62/046,019, filed on Sep. 4, 2014, provisional application No. 62/046,454, filed on Sep. 5, 2014.

(51) Int. Cl.
*F16F 15/129* (2006.01)
*B23P 15/00* (2006.01)
(Continued)

(52) U.S. Cl.
CPC ........... *F16F 15/129* (2013.01); *B60K 17/00* (2013.01); *F02N 15/02* (2013.01); *F16D 1/00* (2013.01);
(Continued)

(58) Field of Classification Search
CPC ................................... F16F 15/129
See application file for complete search history.

(56) References Cited

U.S. PATENT DOCUMENTS 2,346,732 A * 4/1944 Crawford ............. F16F 15/121
74/574.2
4,318,283 A * 3/1982 Windish ................ F16F 15/129
192/214.1
(Continued)

FOREIGN PATENT DOCUMENTS

CN 101595326 A 12/2009
FR 2822907 A1 10/2002

OTHER PUBLICATIONS

Extended European Search Report dated Apr. 26, 2016 from corresponding European patent application Serial No. 15182006.5.
(Continued)

*Primary Examiner* — Terence Boes
(74) *Attorney, Agent, or Firm* — Dickinson Wright PLLC

(57) ABSTRACT

A reduced noise flexplate assembly and method of construction is provided. The assembly includes a central plate that is generally disc shaped and extends radially from an axis. A ring gear is disposed annularly about the central plate and presents a plurality of ring teeth that extend radially therefrom for engaging a pinion gear coupled to a starter of an automobile. A noise plate is attached to the central plate with a plurality of plate fasteners and extends circumferentially about the axis. The noise plate includes a flange and a lower lip extending generally axially and radially outwardly from the inside flange to a maximum deflection zone adjacent to the ring teeth of the ring gear. The noise plate is frictionally engaged with and slideably moveable relative to the central plate and/or ring gear to reduce noise and reduce vibrations during starting of the automobile by converting friction into heat.

18 Claims, 20 Drawing Sheets

(51) Int. Cl.
  *F16H 55/17* (2006.01)
  *B60K 17/00* (2006.01)
  *F16D 3/72* (2006.01)
  *F16H 55/14* (2006.01)
  *F02N 15/02* (2006.01)
  *F16D 1/00* (2006.01)
  *F16D 3/14* (2006.01)
  *F16D 3/77* (2006.01)
  *F16D 65/00* (2006.01)
  *F16F 15/10* (2006.01)
  *F16F 15/30* (2006.01)
  *F02N 11/08* (2006.01)
  *F16D 1/068* (2006.01)
  *F16D 1/072* (2006.01)
  *F16D 1/076* (2006.01)

(52) U.S. Cl.
  CPC ............ *F16D 3/14* (2013.01); *F16D 3/72* (2013.01); *F16D 3/77* (2013.01); *F16D 65/0006* (2013.01); *F16F 15/10* (2013.01); *F16F 15/30* (2013.01); *F16H 55/14* (2013.01); *F02N 11/0814* (2013.01); *F16D 1/068* (2013.01); *F16D 1/072* (2013.01); *F16D 1/076* (2013.01); *F16D 2300/22* (2013.01); *Y02T 10/6204* (2013.01)

(56) References Cited

U.S. PATENT DOCUMENTS

| | | | |
|---|---|---|---|
| 5,323,665 A * | 6/1994 | Rediker, Jr. | F16D 3/77 |
| | | | 192/207 |
| 5,695,034 A * | 12/1997 | Graton | F16F 15/1203 |
| | | | 192/213.12 |
| 6,352,384 B1 | 3/2002 | Frisch et al. | |
| 7,219,578 B2 * | 5/2007 | Hada | F16D 1/076 |
| | | | 464/98 |
| 8,590,683 B2 | 11/2013 | Tsukamoto et al. | |
| 2007/0277643 A1 | 12/2007 | King et al. | |
| 2011/0031058 A1 | 2/2011 | Klotz et al. | |
| 2014/0157929 A1 | 6/2014 | Yin | |

OTHER PUBLICATIONS

"Introduction to Tog-L-Loc®: An overview of BTM's Tog-L-Loc® sheet metal clinching system," BTM Corporation, http://www.BTMcorp.com, 733864CA.

\* cited by examiner

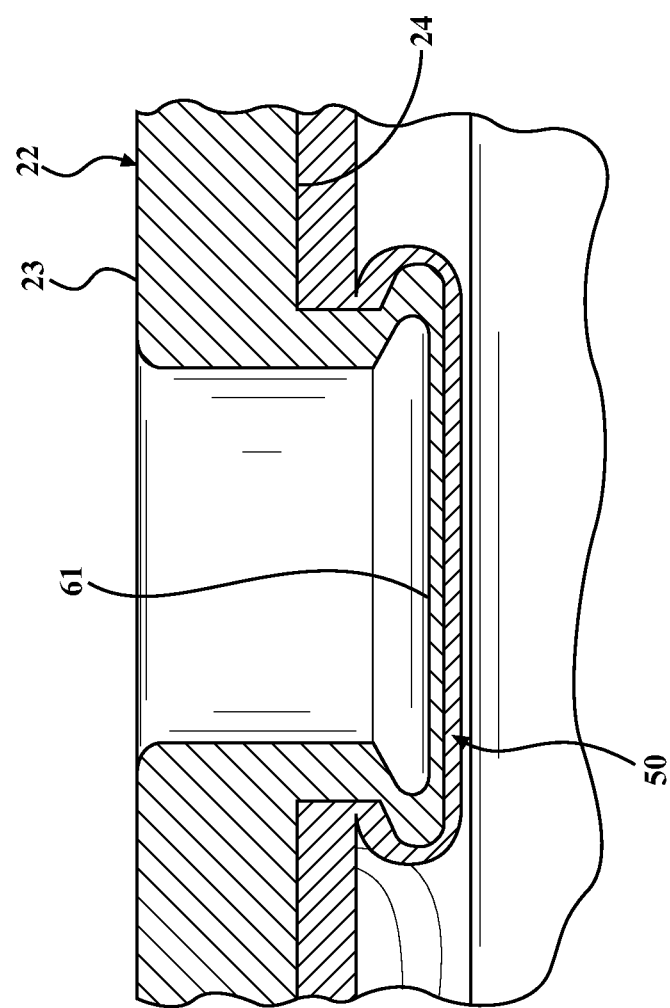

REDUCED NOISE FLEXPLATE

CROSS REFERENCE TO RELATED APPLICATIONS

This application claims the benefit of and priority to U.S. Provisional Application No. 62/046,019, filed Sep. 4, 2014 and U.S. Provisional Application No. 62/046,454, filed Sep. 5, 2014, the entire disclosures of which are incorporated herein by reference.

FIELD

The present disclosure relates generally to a flexplate assembly for use with a powertrain in a motor vehicle.

BACKGROUND

This section provides background information related to the present disclosure which is not necessarily prior art.

A flywheel, or flexplate, is a known component in automobiles. As appreciated, the flexplate operates as a mechanical coupling between crankshaft (i.e. output) of an engine and a torque convertor of a transmission. Consequently, the flexplate transmits torque to the transmission. Additionally, the flexplate serves as an engagement point for a pinion gear of an electric starter motor. When the electric starter motor receives an electrical current in response to an ignition signal from the vehicle, the pinion gear engages and drives a ring gear portion of the flexplate, thereby causing the flexplate to rotatably drive the engine crankshaft. Upon the engine being successfully started, the pinion gear is disengaged while the flexplate continues to be rotatably driven by the crankshaft.

The starter's pinion gear generally impacts, both axially and radially, the flexplate during starting of automobiles, which can thereby cause noise which can be unpleasant to passengers in the automobile. With the increased frequency of starting modern automobiles (e.g. stop-start technology), noise reduction during starting is becoming increasingly important. Accordingly, there is a growing need for flexplate assemblies with improved noise reduction.

SUMMARY

This section provides a general summary of the present disclosure and is not intended to be interpreted as a comprehensive disclosure of its full scope or all of its features, aspects and objectives.

Accordingly, it is an aspect of the present disclosure to provide a flexplate assembly including a central plate having a general disc shape that is disposed about and extends radially from an axis. A ring gear is annularly secured about the central plate and presents an outer circumference defining a plurality of ring teeth extending therefrom. At least one noise plate is disposed adjacent to the central plate and extends circumferentially about the axis for reducing vibrations and noise from the flexplate assembly. The noise plate is frictionally engaged with and slideably moveable relative to the central plate for reducing noise and reduce vibrations by converting friction between the noise plate and the central plate into heat.

It is another aspect of the present disclosure to provide a method of constructing a flexplate assembly. The method includes the step of forming a central plate. Next, forming a ring gear about the central plate. The method proceeds with the step of forming at least one noise plate. The method concludes with the step of attaching the noise plate to the central plate and ring gear, wherein the noise plate is frictionally engaged with and slideably moveable relative to the central plate and ring gear.

These and other aspects and areas of applicability will become apparent from the detailed written description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIG. 8C is an enlarged partial cross-sectional view of the flexplate assembly shown in FIG. 8A illustrating a plate fastener;

DETAILED DESCRIPTION

Figure 1:
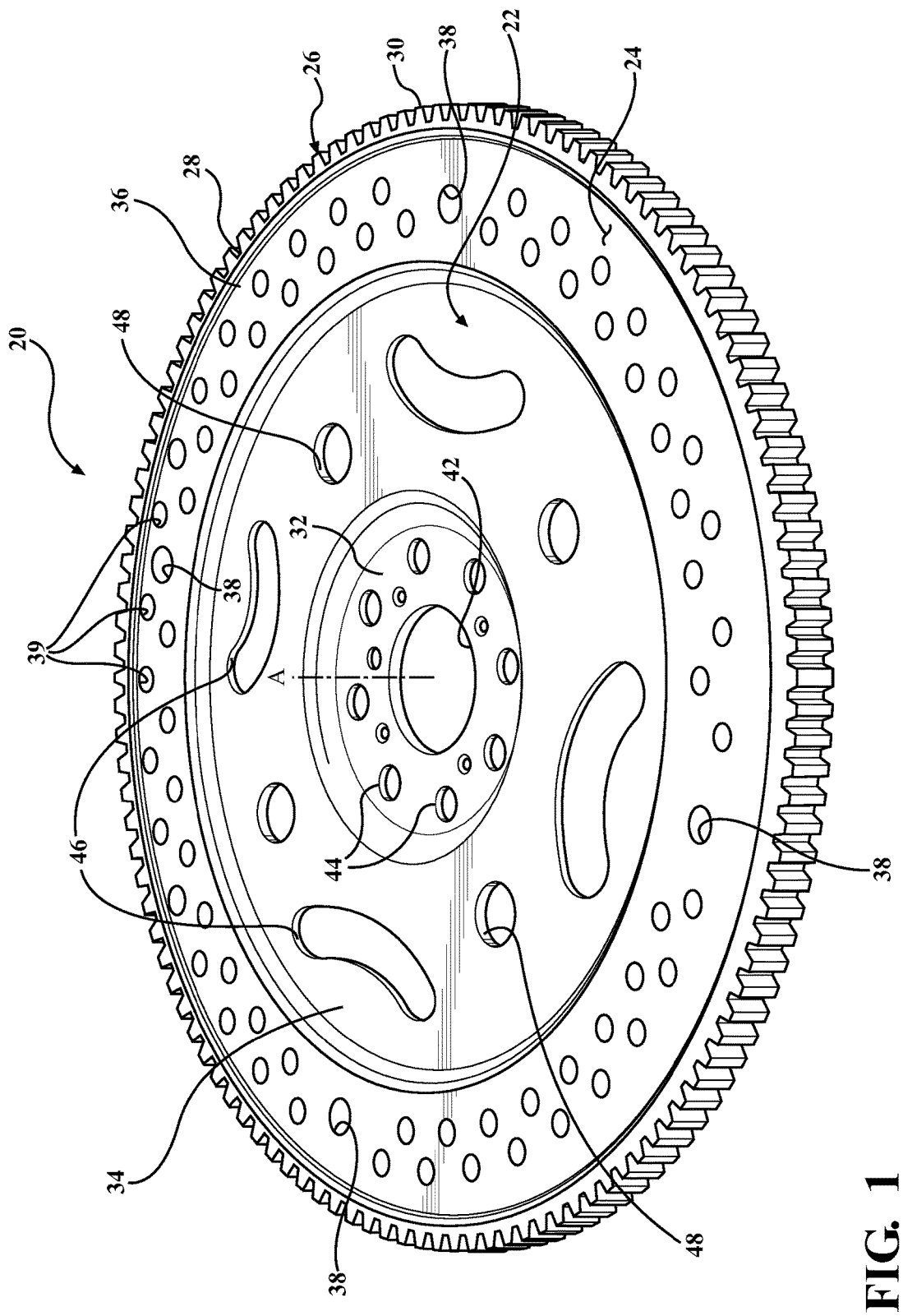
FIG. 1 is a perspective view of a flexplate assembly illustrating a central plate and a ring gear according to an aspect of the disclosure.

In the following description, details are set forth to provide an understanding of the present disclosure. In some instances, certain structures and techniques have not been described or shown in detail in order not to obscure the disclosure.

In general, the present disclosure relates to flexplate assemblies used for conveying rotational energy in various power operated devices of the type well-suited for use in many applications. The flexplate assembly of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring to the Figures, wherein like numerals indicate corresponding parts throughout the several views, a flexplate assembly 20, 120 for use with a powertrain in a motor vehicle is generally shown. The flexplate assembly 20, 120 includes a central plate 22 that has a generally disc shape that is disposed about and extends radially from an axis A and presents a top surface 23 and a bottom surface 24. A ring gear 26 is disposed annularly about the central plate 22 and presents an outer circumference 28. The outer circumference 28 of the ring gear 26 presents a plurality of ring teeth 30 that extend radially therefrom for engaging pinion teeth of a pinion gear (not shown) coupled to a starter of an automobile to rotate the flexplate assembly 20, 120.

According to an aspect of the disclosure, the central plate 22 extends radially from the axis A from an inner portion 32, to an intermediate portion 34, to an outer portion 36, as best shown in FIG. 1. The inner portion 32 has a generally hemispherical cross-sectional shape. The intermediate portion 34 is stepped axially from the inner and outer portions 32, 36. The outer portion 36 defines a plurality of mounting apertures 38 circumferentially and evenly spaced from one another about the outer portion 36 for receiving a plurality of first mounting bolts (not shown) for securing the flexplate assembly 20 to a torque convertor (not shown). The outer portion 36 may also define secondary apertures 39 for reducing the weight of the central plate 22. According to an aspect, an insert 40 (FIGS. 8B and 9A) may also be disposed in each mounting aperture 38 to provide a more secure attachment between the flexplate assembly 20 and the torque convertor.

Figure 3:
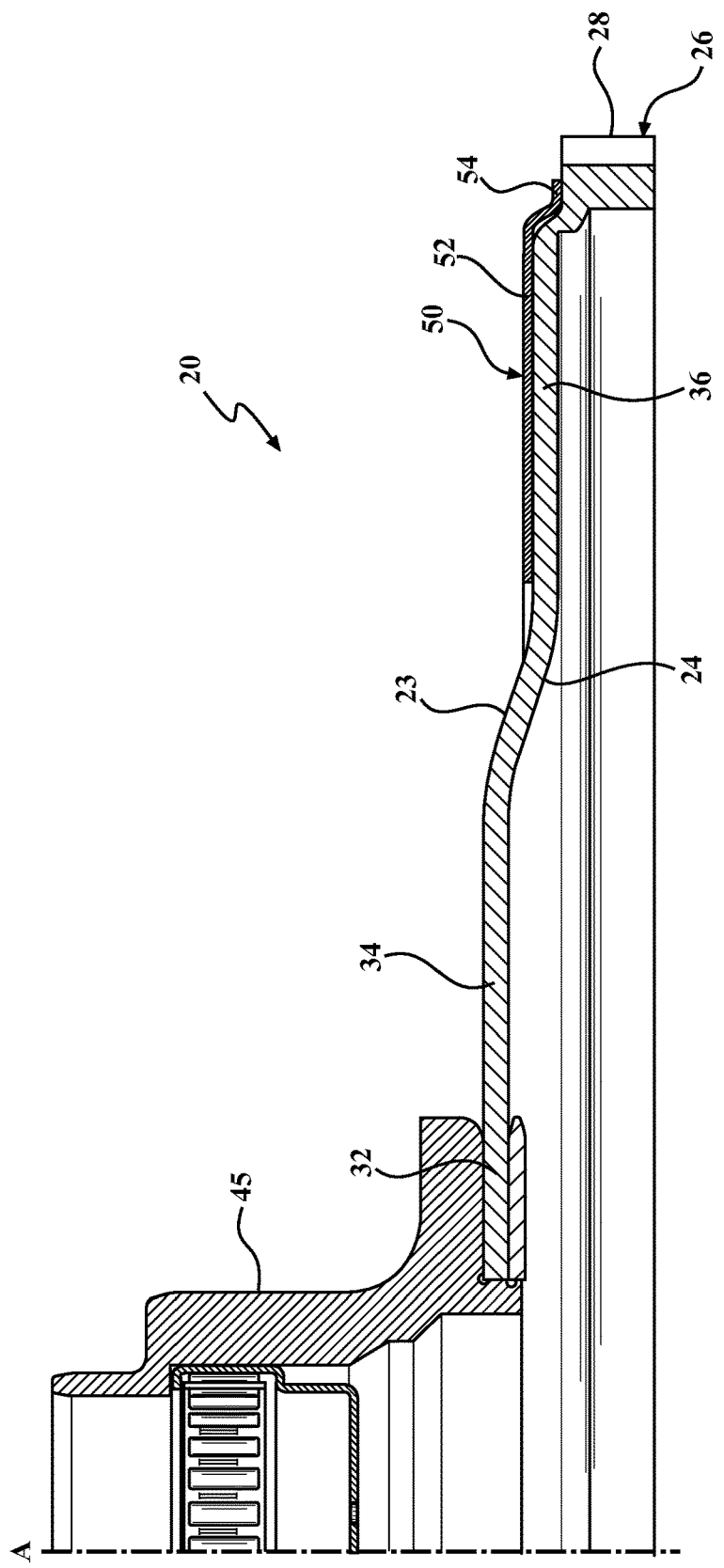
FIG. 3 is a partial side cross-sectional view of a flexplate assembly illustrating a noise plate according to an aspect of the disclosure.
Figure 4:
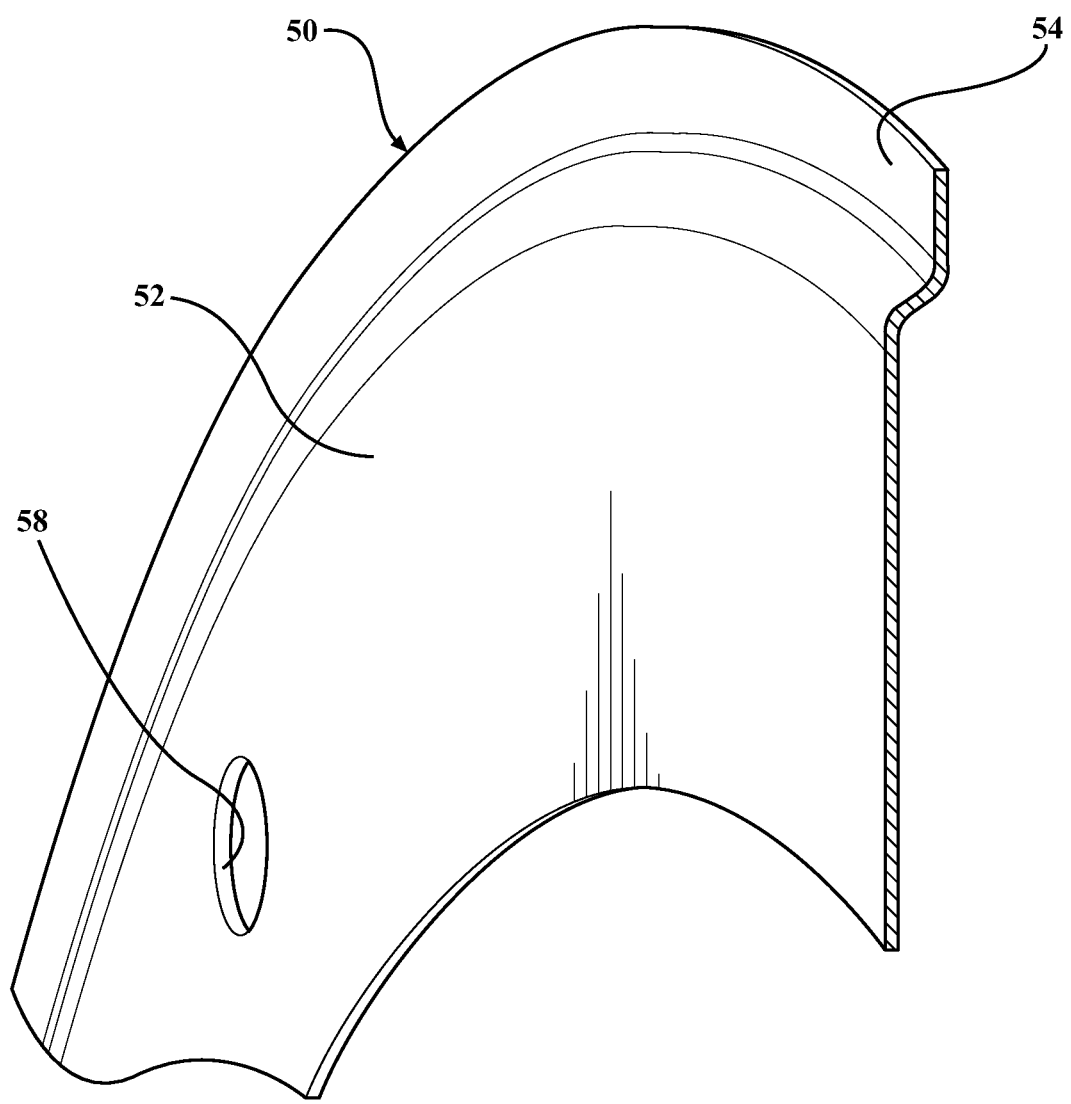
FIG. 4 is a partial perspective cross-sectional view of the noise plate shown in FIG. 3.
Figure 5:
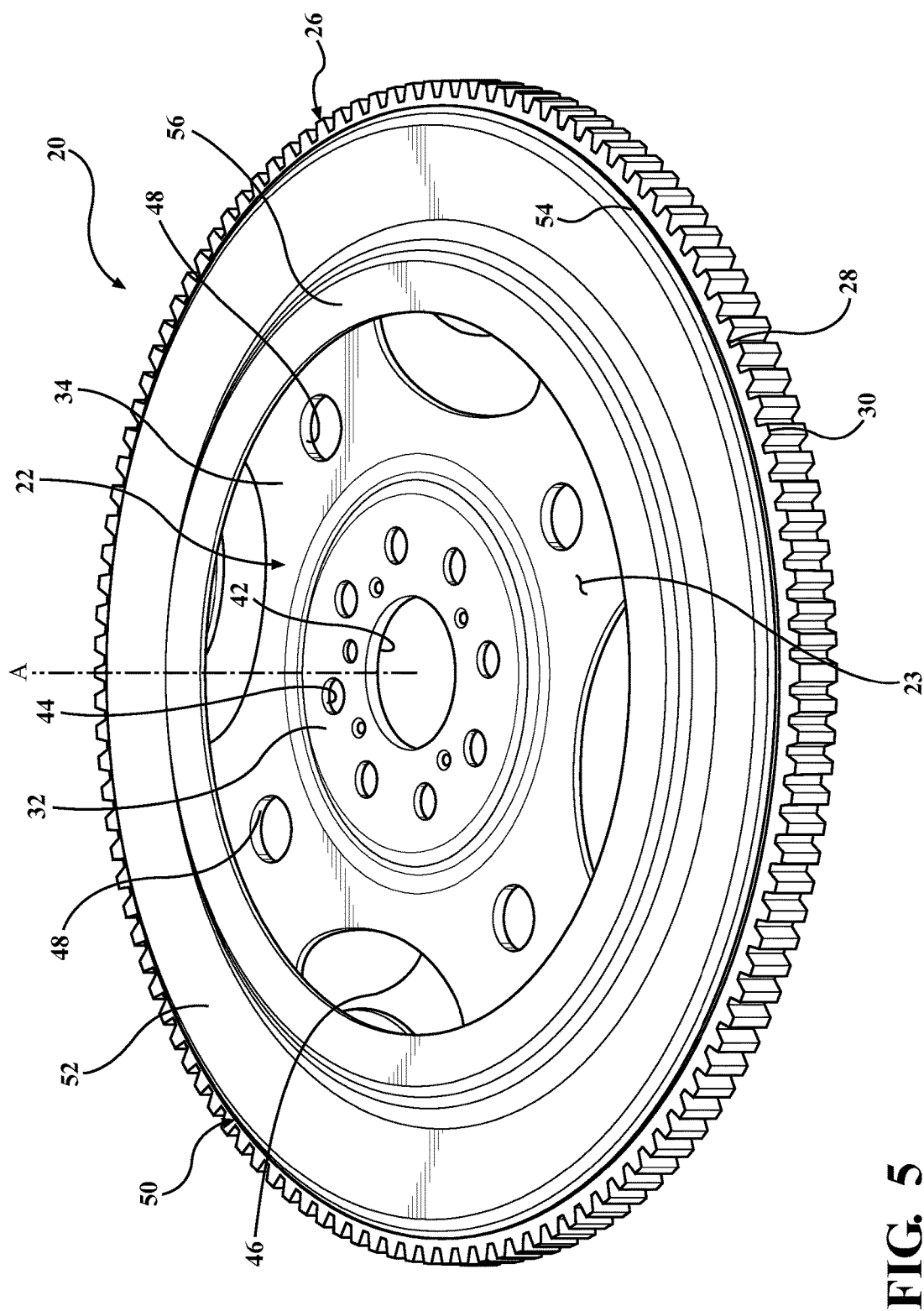
FIG. 5 is a perspective view of a flexplate assembly illustrating a central plate, a ring gear, and a noise plate according to an aspect of the disclosure.
Figure 6:
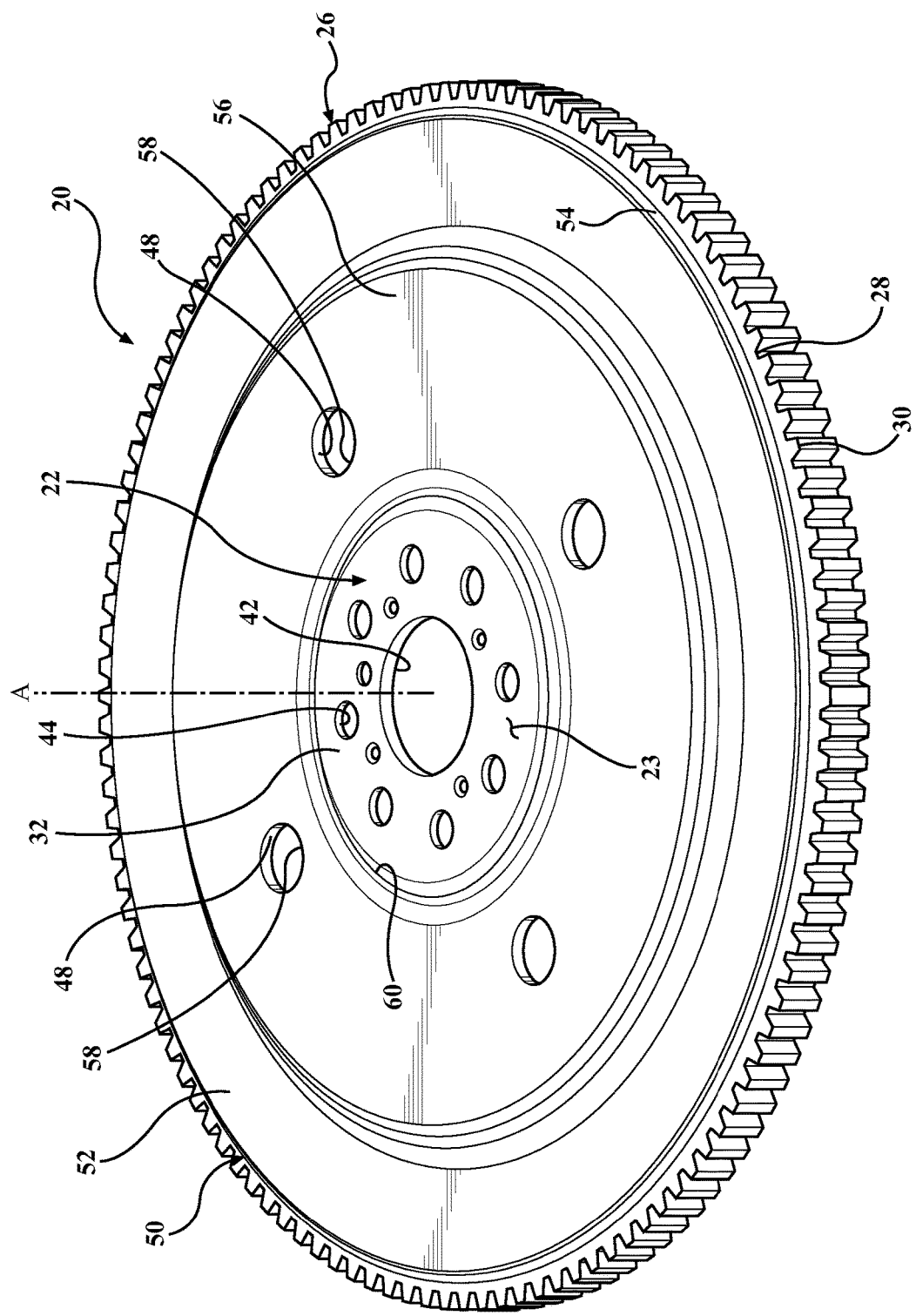
FIG. 6 is a perspective view of a flexplate assembly illustrating a central plate, a ring gear, and a noise plate according to an aspect of the disclosure.
Figure 7:
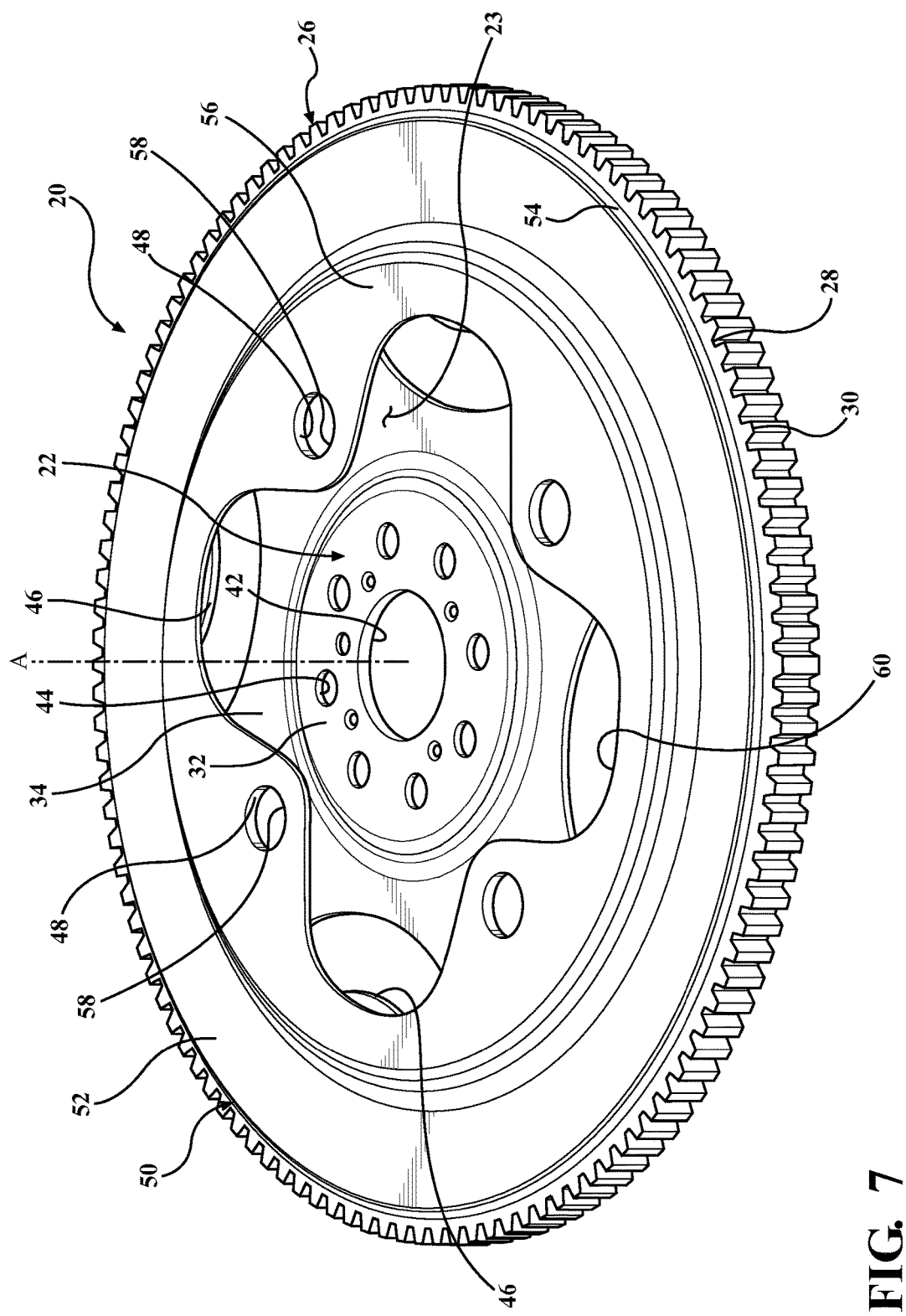
FIG. 7 is a perspective view of a flexplate assembly illustrating a central plate, a ring gear, and a noise plate according to an aspect of the disclosure.

The inner portion 32 defines a central opening 42 extending through the central plate 22 along the axis A for receiving and securing the flexplate assembly 20 to a crankshaft (not shown). The inner portion 32 of the central plate 22 defines a plurality of attaching apertures 44 circumferentially and evenly spaced from one another about the inner portion 32 for receiving a plurality of second mounting bolts for securing the flexplate assembly 20 to a hub 45 (FIG. 3) of the crankshaft.

The intermediate portion 34 of the central plate 22 defines a plurality of first slots 46 that have a kidney shape and are circumferentially and evenly spaced about the intermediate portion 34 for providing for flexibility and reduced weight of the central plate 22. The intermediate portion 34 of the central plate 22 further defines a plurality of second slots 48 that have a circular shape and are circumferentially and evenly spaced about the intermediate portion 34 for also providing for reduced weight of the central plate 22. It should be appreciated that more or fewer apertures 38, 39, 44, and slots 46, 48 of various sizes and shapes could be defined by the central plate 22 to accommodate for other configurations of the central plate 22.

As best shown in FIGS. 2-11, the flexplate assembly 20 further includes a noise plate 50 that is disposed adjacent to the central plate 22 and extends circumferentially about the axis A for reducing vibrations and noise from the flexplate assembly 20. While vibrations and noise from the flexplate assembly 20 may primarily occur for example during starting of the automobile when the pinion gears of the starter of the automobile impact the ring teeth 30 of the ring gear 26 of the flexplate assembly 20, it should be understood that the noise plate 50 may reduce vibrations and noise at other times. In the disclosed embodiments, the noise plate 50 is made of a steel material but it should be appreciated that the noise plate 50 could be made of other materials such as, but not limited to, aluminum or plastics. In the disclosed embodiments, the noise plate 50 is frictionally engaged with and slideably moveable relative to the central plate 22 and/or ring gear 26 to reduce noise and reduce vibrations during starting of the automobile by converting friction into heat. In other words, the noise plate 50 is frictionally engaged with the central plate and/or ring gear 26 for permitting limited sliding movement of the noise plate 50 relative to the central plate 22 and/or ring gear 26. The noise plate 50 and central plate 22 and/or ring gear 26 may move relative to one another in radial, axial, and/or angular directions depending on the design of the central plate 22 and noise plate 50.

According to an aspect of the disclosure, the noise plate 50 could be constructed in various shapes and configurations. In embodiments shown in FIGS. 2-4, the noise plate 50 generally has a ring shape and includes a flange 52 and a lower lip 54 extending generally axially and radially outwardly from the flange 52 to a maximum deflection zone adjacent to the ring teeth 30 of the ring gear 26. It should be appreciated that the noise plate 50 could also extend between the ring gear 26 and the central plate 22. In further embodiments best shown in FIGS. 5-7, the noise plate 50 also includes an upper lip 56 that extends generally axially away from and radially inwardly from the flange 52 toward the axis A (i.e. crankshaft centerline). By extending the noise plate 50 into the maximum deflection zone and/or inwardly toward the axis A, the effective noise plate-to-central plate sliding interface or surface area may be increased which consequently provides for maximum noise reduction by conversion of friction to heat. Additionally, noise plate 50 may define a plurality of apertures 58 extending through the noise plate 50. According to an aspect, the upper lip 56 defines a middle opening 60 about the axis A. In the embodiment disclosed in FIG. 6, the upper lip 56 defines apertures 58 which are aligned with the upper slots 48 of the central plate 22. Additionally, in the embodiment of FIG. 7, the middle opening 60 has a general cross shape.

Figure 8A:
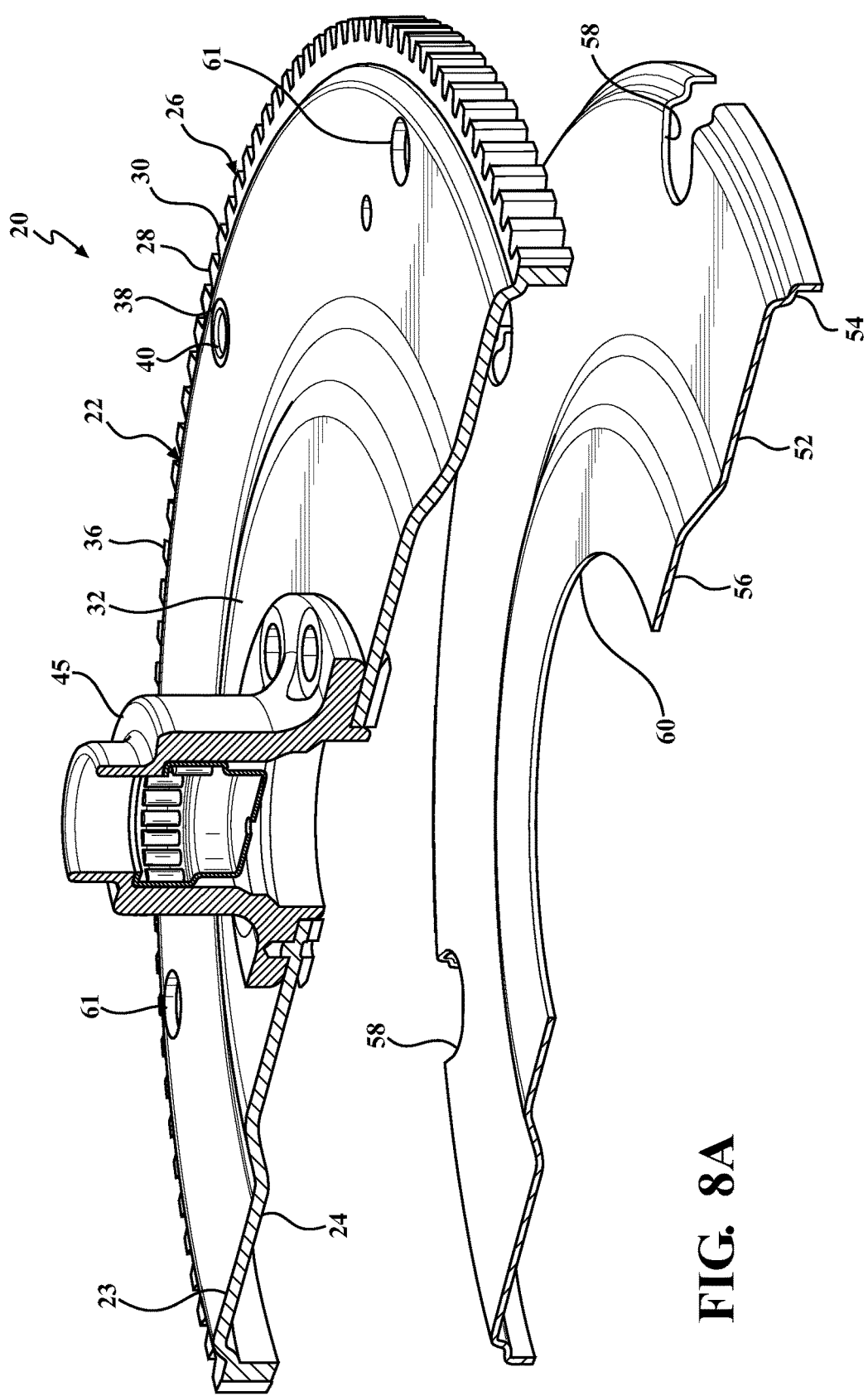
FIG. 8A is an exploded cross-sectional view of a flexplate assembly according to an aspect of the disclosure.
Figure 8B:
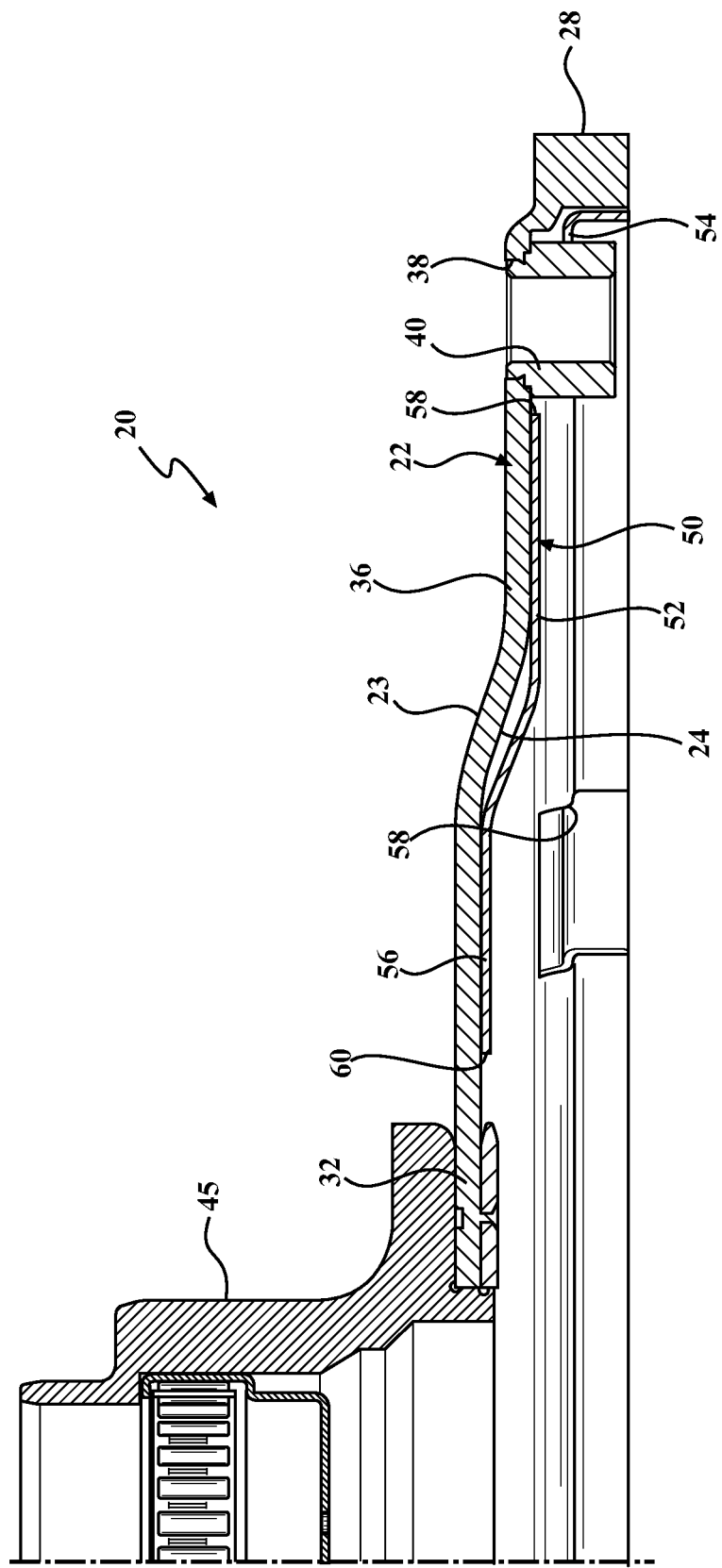
FIG. 8B is a partial side cross-sectional view of the flexplate assembly shown in FIG. 8A.
Figure 9:
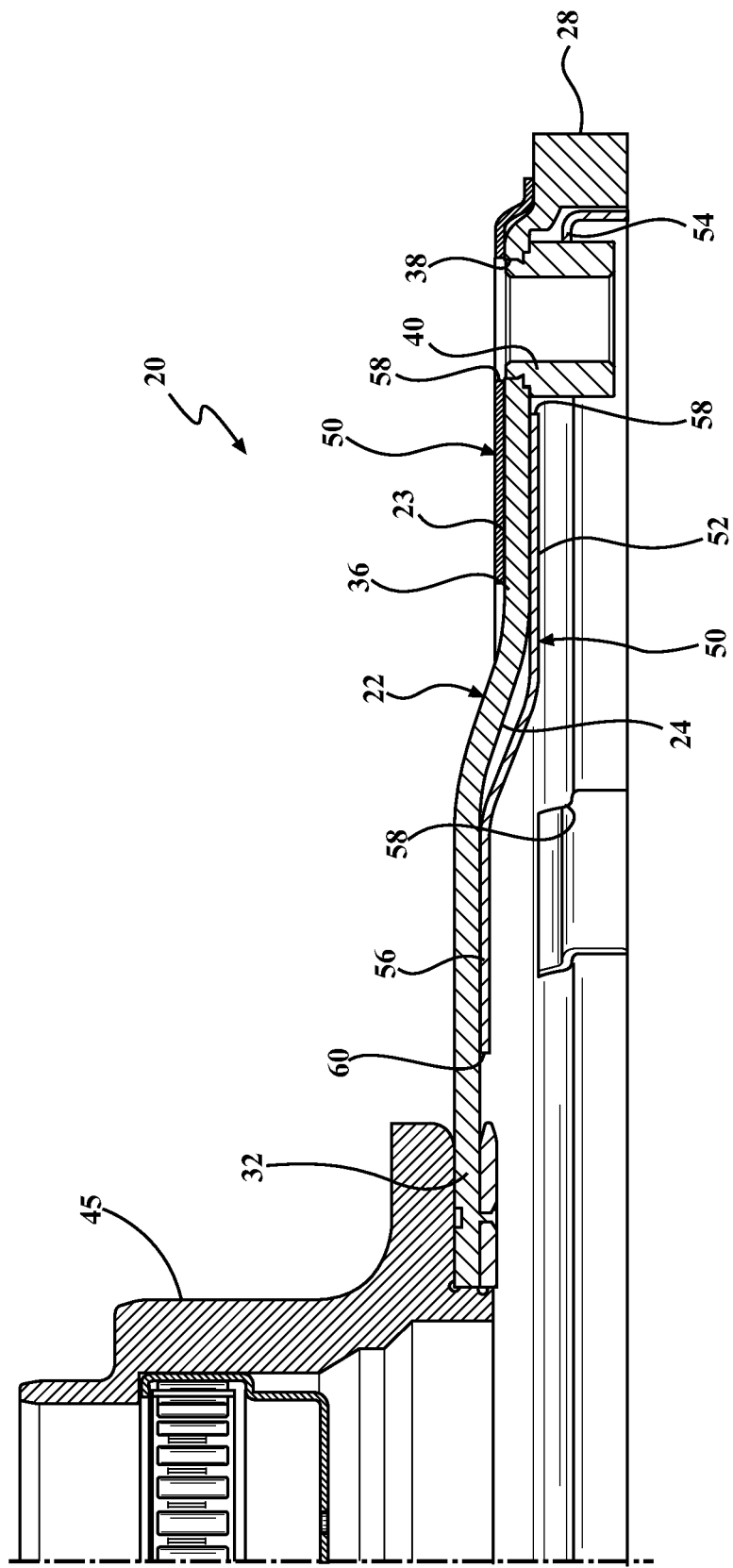
FIG. 9 is a partial side cross-sectional view of a flexplate assembly according to an aspect of the disclosure.
Figure 10:
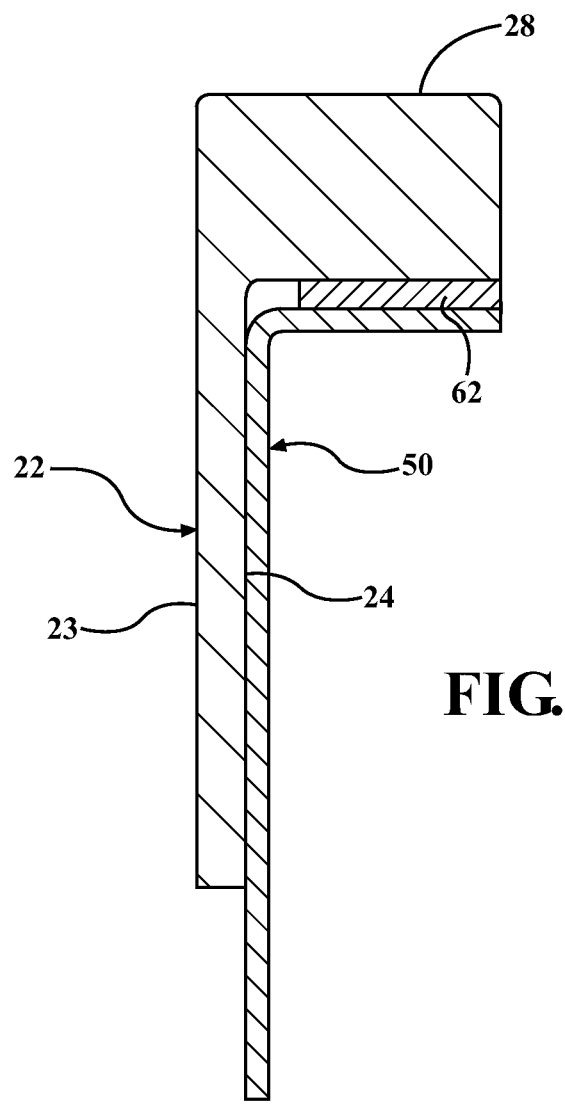
FIG. 10 is an enlarged partial cross-sectional view of a central plate and noise plate of a flexplate assembly according to an aspect of the disclosure illustrating an additional damping material.

It should be appreciated that the flange 52, lower lip 54, and upper lip 56 of the noise plate 50 could have various shapes and sizes to increase relative sliding between the noise plate 50 and central plate 22 and/or ring gear 26 to provide for increased reduction of noise and vibrations through increased conversion of friction to heat. Additionally, it should be appreciated that the noise plate 50 could engage to the central plate 22 and/or ring gear 26 with or without tabs (i.e. fingers). According to an aspect, the tabs could extend from the noise plate 50 toward the periphery of the central plate 22 or ring gear 26 to provide spring-like compressive forces on the ring gear 26 for increased friction to heat conversion and to provide for additional impact cushioning and compliance. According to another aspect, the noise plate 50 may also be preshaped, whereby its periphery or tabs provide spring-like compressive force on the central plate 22 or ring gear 26 once assembled with the central plate 22 and the ring gear 26. The perimeter of the flexplate assembly 20, 120 may additionally be frequency "tuned" using the tabs or without the use of tabs. Although the noise plate 50 may primarily engage the central plate 22 at its periphery, according to an aspect, it could fully or partially engage it at other locations. Additionally, a surface treatment, texture, or coating may be applied to regions of or the entire noise plate 50, central plate 22, and/or ring gear 26 in order to alter the friction coefficient between the noise plate 50, the central plate 22, and/or the ring gear 26. Furthermore, while the noise plate 50 can be disposed adjacent to the top surface 23 of the central plate 22 (FIGS. 2-7), it should be appreciated that the noise plate 50 could be positioned adjacent to the bottom surface 24, as illustrated in FIGS. 8A-8C.

Figure 2:
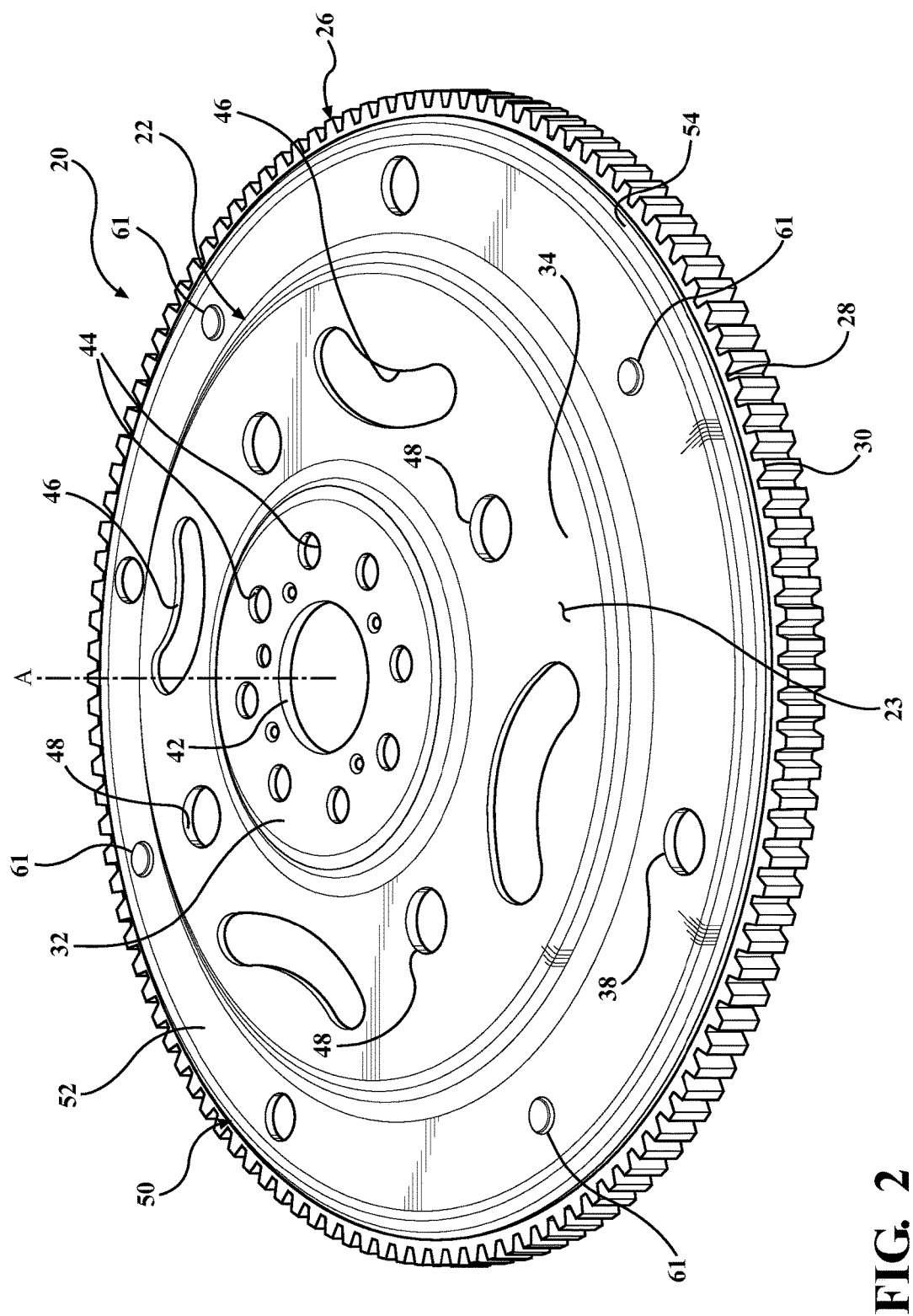
FIG. 2 is a perspective view of a flexplate assembly illustrating a central plate, a ring gear, and a noise plate according to an aspect of the disclosure.

The noise plate 50 may be attached to the central plate 22 using various plate fasteners 61. According to an aspect, the plate fasteners 61 are a plurality of clinched areas 61 (e.g. Tog-L-Loc®) spaced from one another and disposed circumferentially about the outer portion 36 of the central plate 22, as best shown in FIGS. 2, 8A and 8C. It should be understood that the plate fasteners 61 may alternatively comprise other fasteners such as, but not limited to epoxy, spot welding, rivets, or bolts. According to an aspect, the noise plate 50 may also be snap fit to the central plate 22. According to another aspect, the noise plate 50 may be partially and peripherally joined to the central plate 22 and/or ring gear 26.

Figure 11:
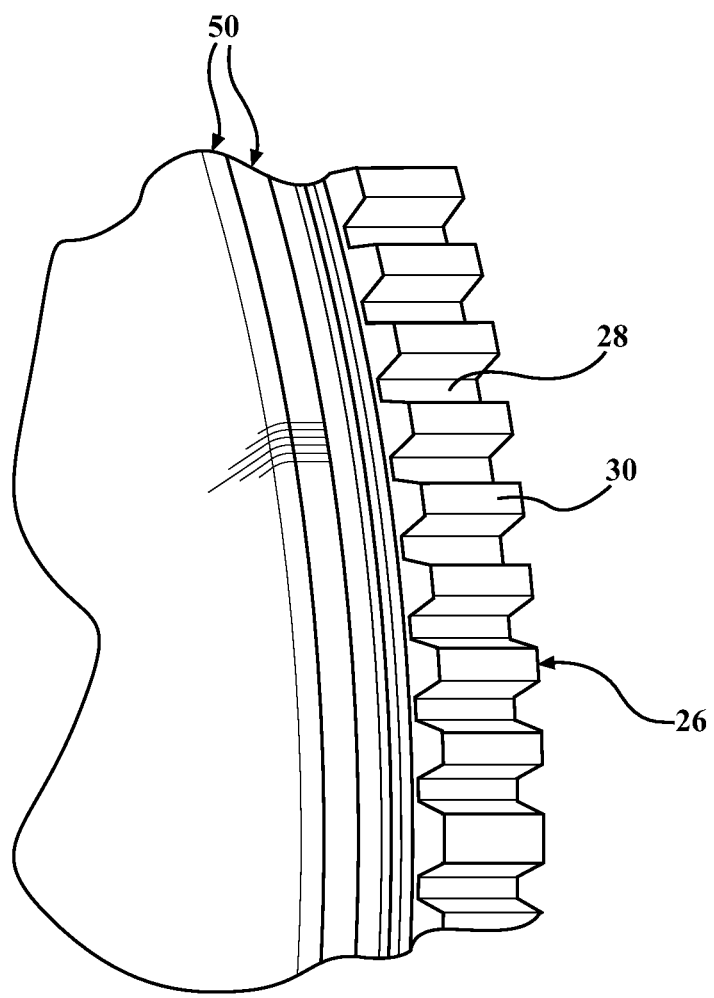
FIG. 11 is an enlarged partial perspective view of a flexplate assembly according to an aspect of the disclosure illustrating a pair of noise plates.

According to an aspect of the disclosure, one noise plate 50 may also be disposed adjacent to the top surface 23 of the central plate 22 and another noise plate 50 may be disposed adjacent to the bottom surface 24 as best shown in FIGS. 9A-9C. Furthermore, as best presented in FIG. 10, an additional damping material 62, such as but not limited to an organic polymeric material, could be disposed between the noise plate 50 and central plate 22 and/or ring gear 26 to provide for additional noise and vibration reduction. According to another aspect, the flexplate assembly 20 includes a plurality of noise plates 50 both disposed adjacent to the top surface 23 of the central plate 22, as shown in FIG. 11. It should be appreciated that the additional damping material 62 may also be disposed between each of the plurality of noise plates 50 which are disposed adjacent to the top surface 23 of the central plate 22.

Figure 12A:
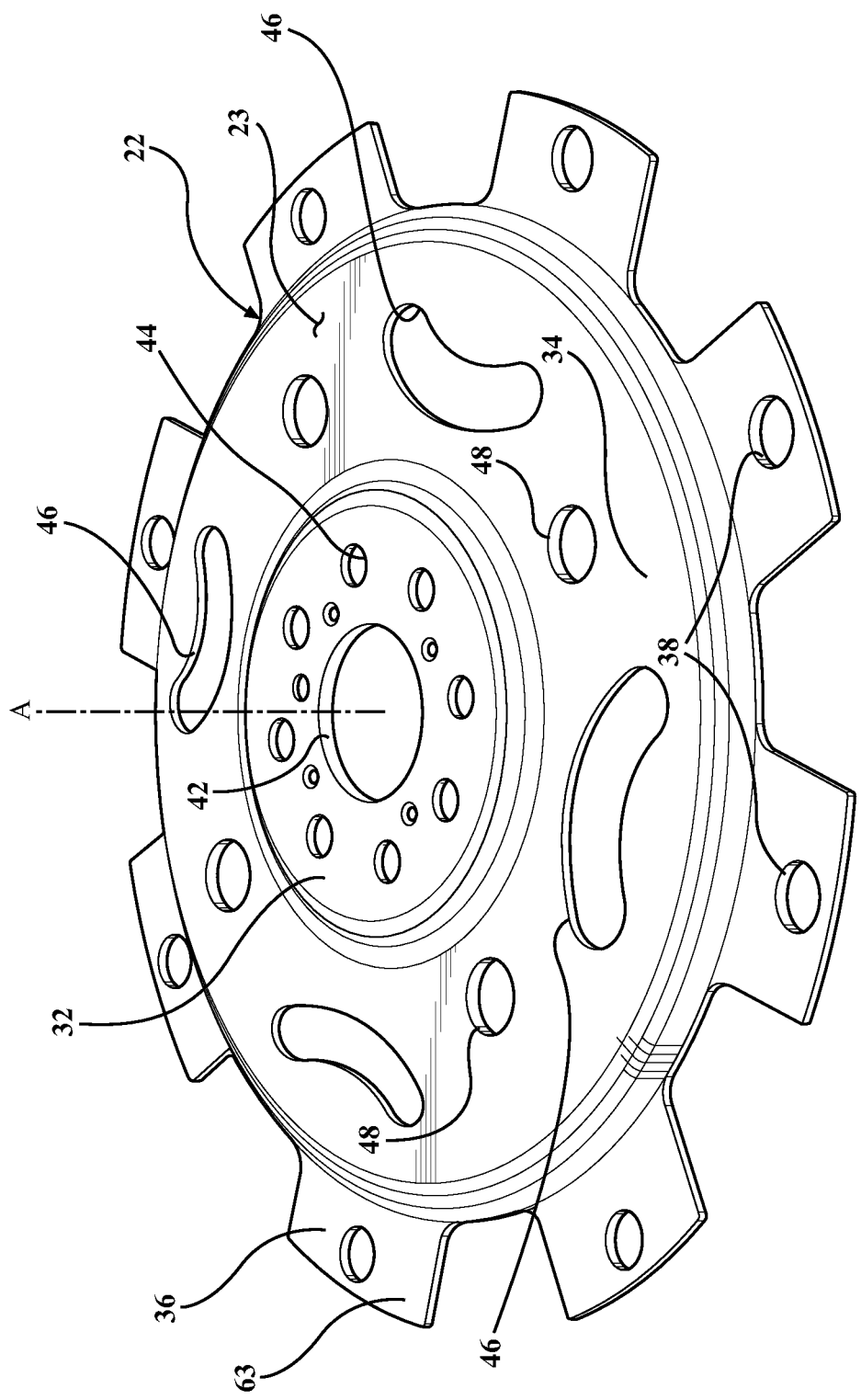
FIG. 12A is a perspective view of a central plate of a flexplate assembly according to an aspect of the disclosure.
Figure 12B:
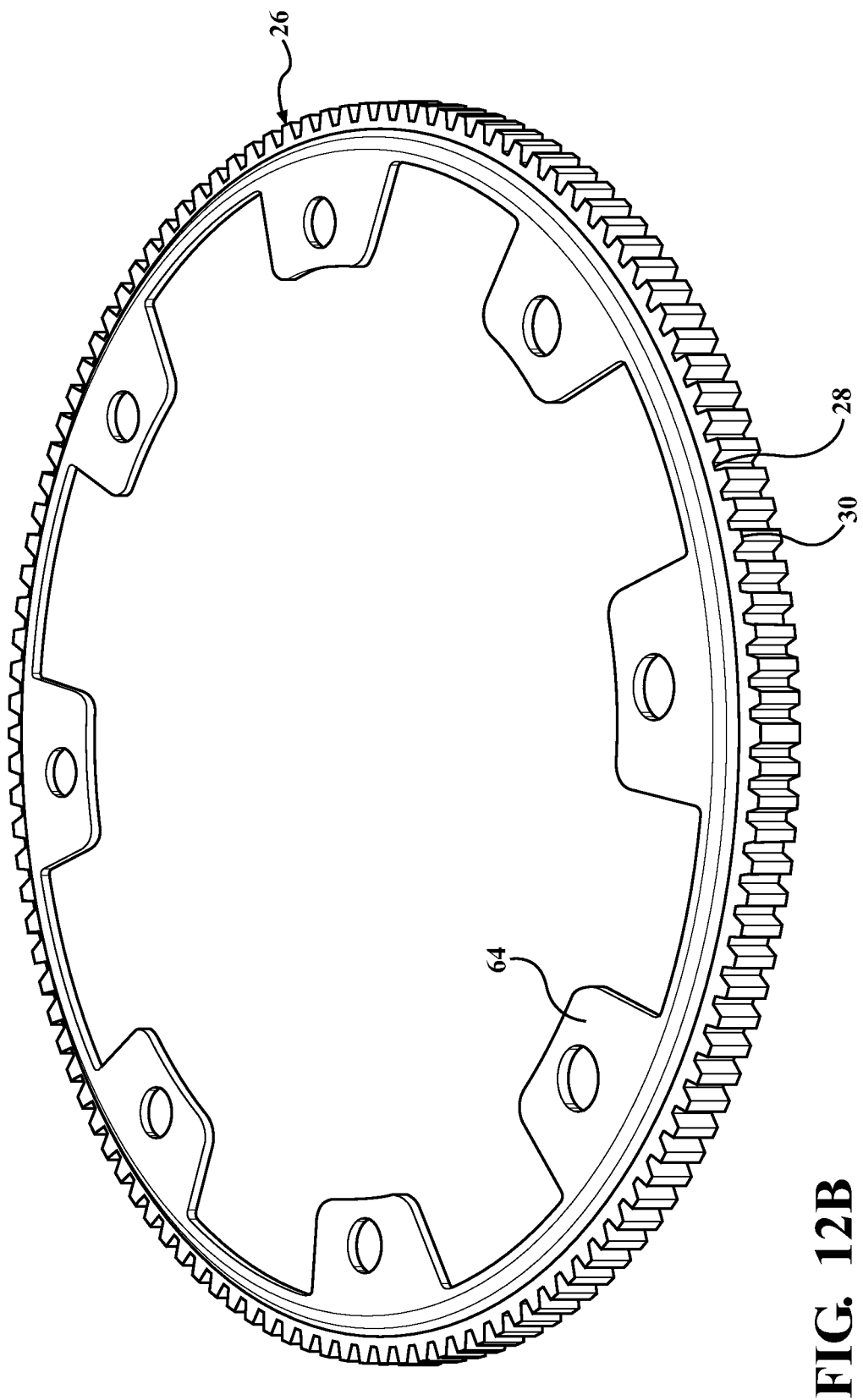
FIG. 12B is a perspective view of a ring gear of a flexplate assembly according to an aspect of the disclosure.
Figure 12C:
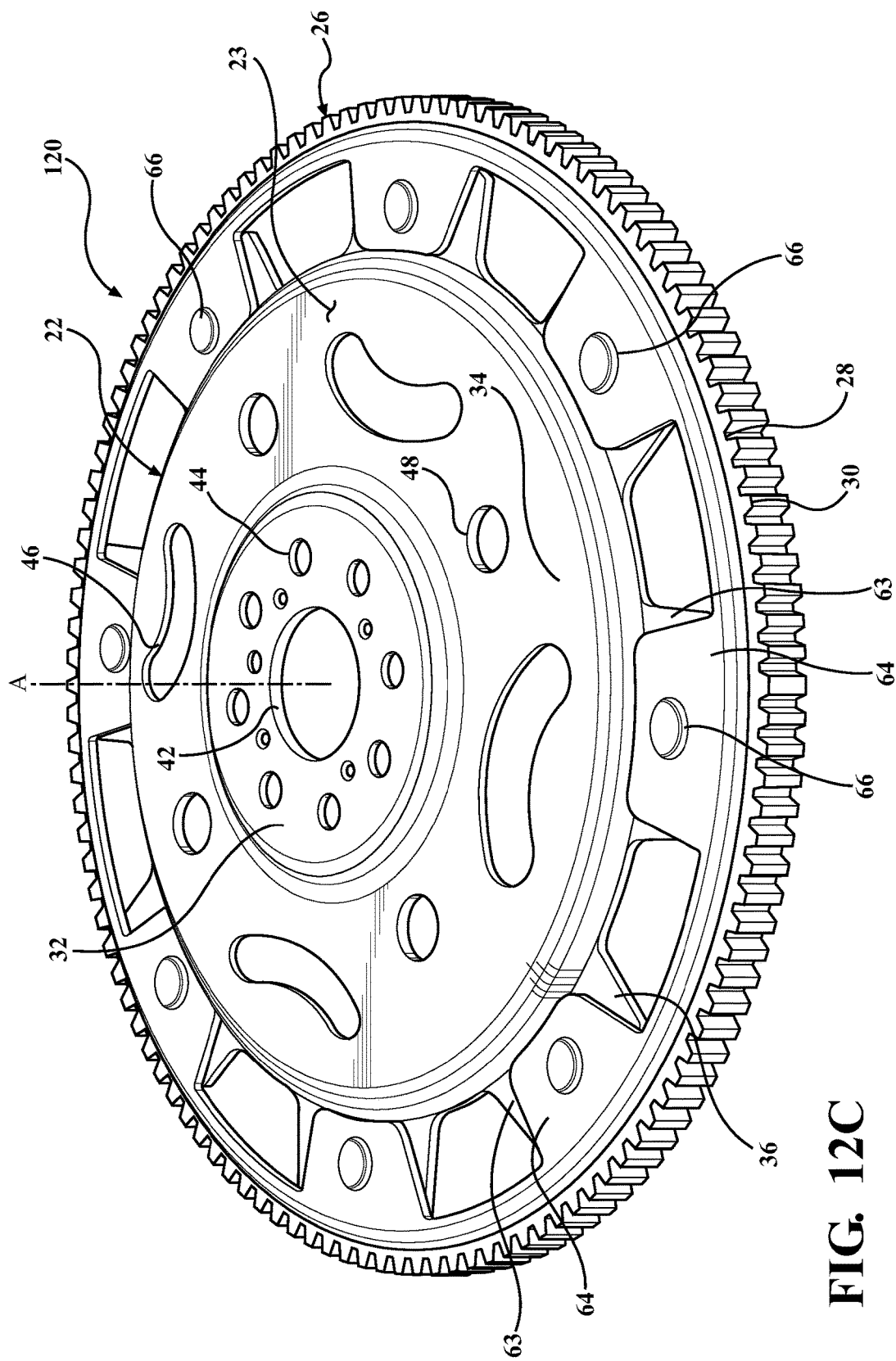
FIG. 12C is a perspective view of a flexplate assembly according to an aspect of the disclosure.

In an alternate embodiment of the disclosure as best presented in FIGS. 12A-12C, the outer portion 36 of the central plate 22 is defined by a plurality of first lugs 63 (FIG. 12A) that extend radially from the intermediate portion 34 of the central plate 22 and are circumferentially and evenly spaced from one another about the central plate 22. Further, the ring gear 26 presents a plurality of second lugs 64 (FIG. 12B) that extend radially inwardly from the outer circumference 28 and are circumferentially and evenly spaced from one another about the ring gear 26. As best shown in FIG. 12C, the central plate 22 and ring gear 26 may be attached together. Specifically, each of the first lugs 63 of the central plate 22 overlies one of the second lugs 64 of the ring gear 26 to coaxially align the central plate 22 and ring gear 26. A lug fastener 66 connects each of the respective pairs of first and second lugs 63, 64 to secure the central plate 22 and ring gear 26 to one another. In the disclosed embodiment, the lug fasteners 66 are rivets, however, it should be appreciated that other lug fasteners 66 could be used such as, but not limited to bolts, welding, epoxy, or clinching. According to an aspect of the disclosure, the noise plate 50 could be connected with the central plate 22 and/or ring gear 26 in the same ways as for the other disclosed embodiments to form the flexplate assembly 120. It should be appreciated that in this embodiment, to reduce noise and minimize materials used, the central plate 22 and the ring gear 26 are separated from an original one-piece flexplate. These pieces 22, 26 are then reassembled by rotationally displacing them from one another and refastening them (riveting, etc.).

Figure 13A:
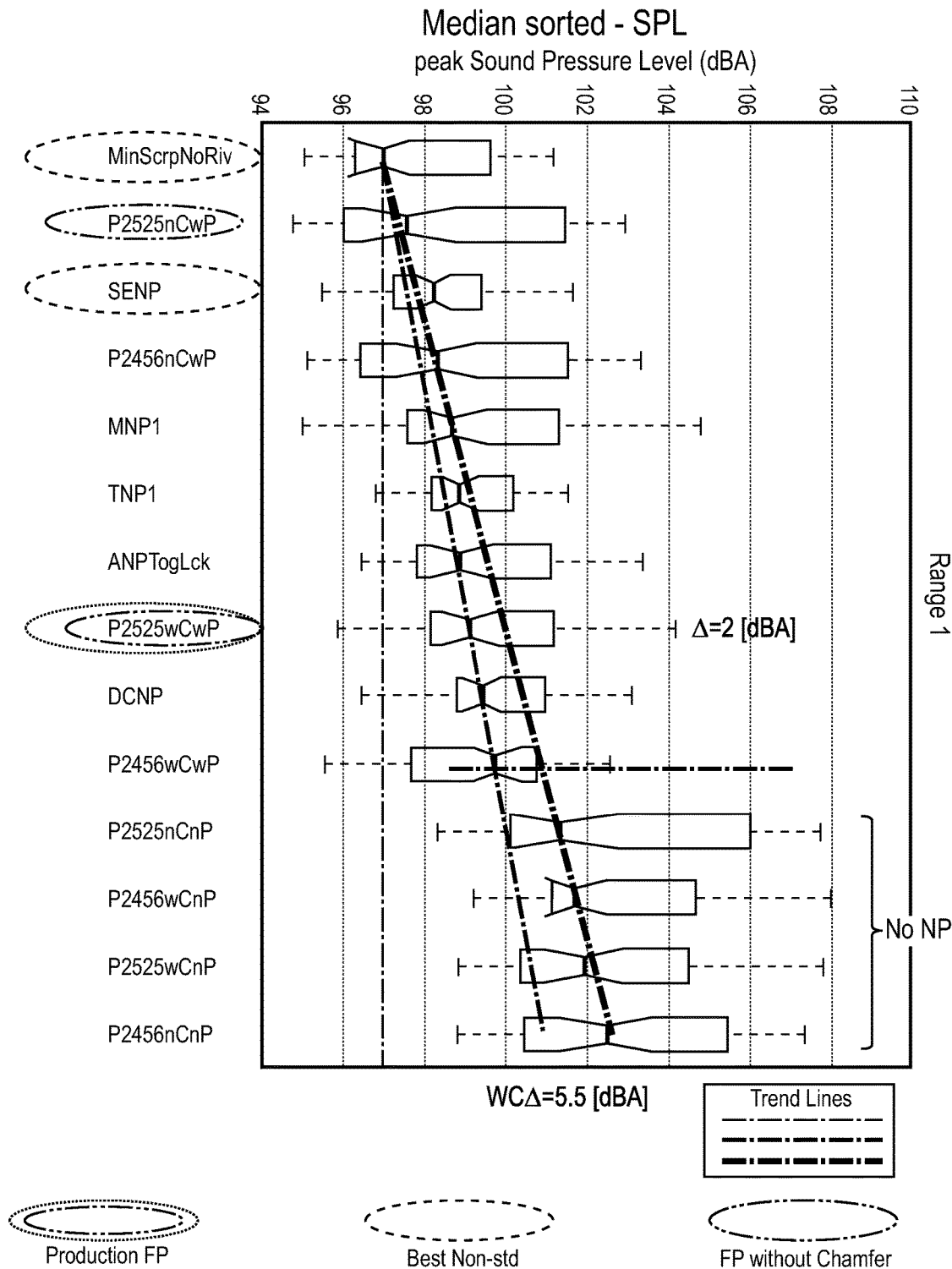
FIGS. 13A-13B are graphs illustrating testing results of flexplate assemblies according to aspects of the disclosure.
Figure 13B:
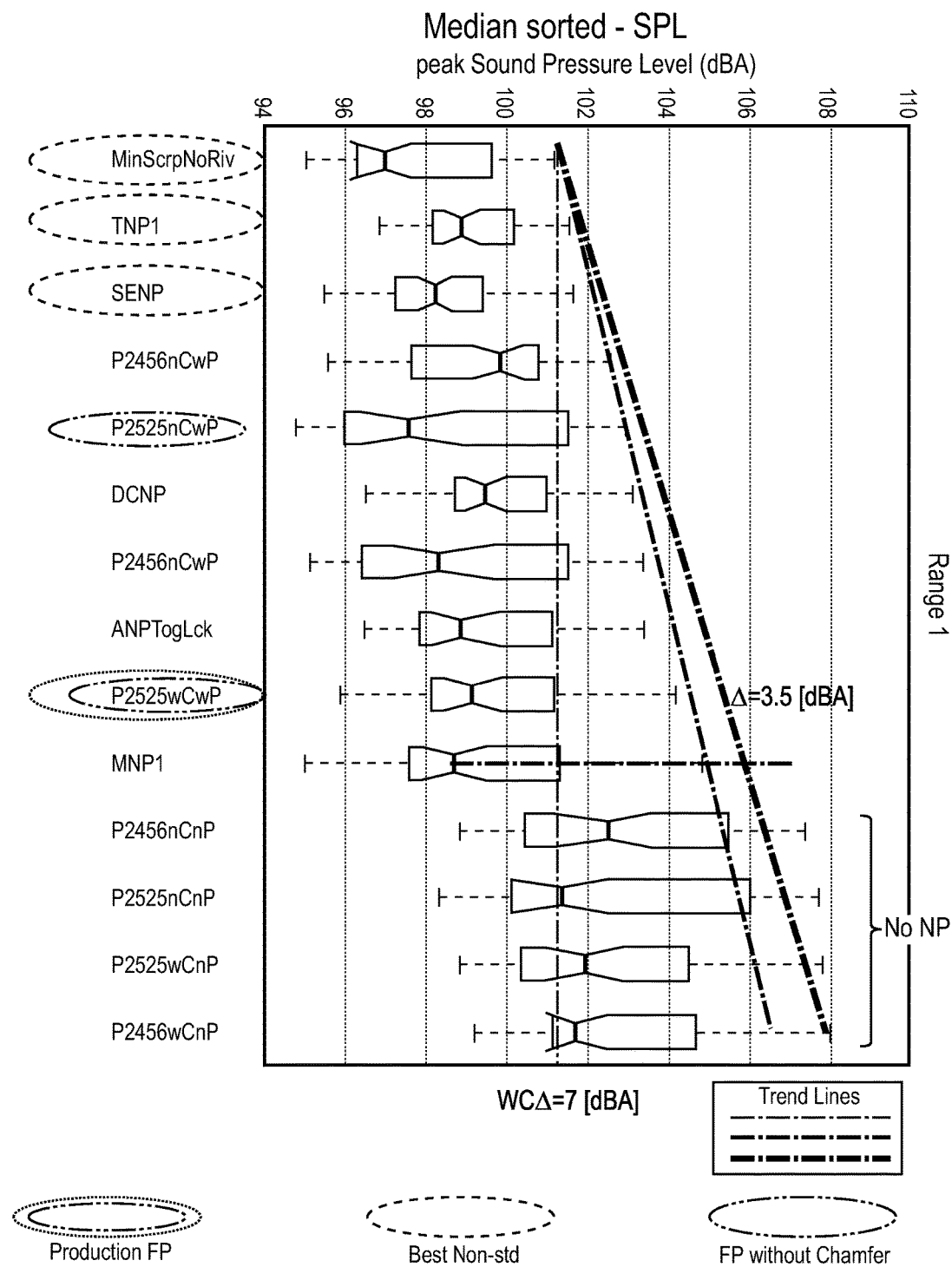
Figure 14:
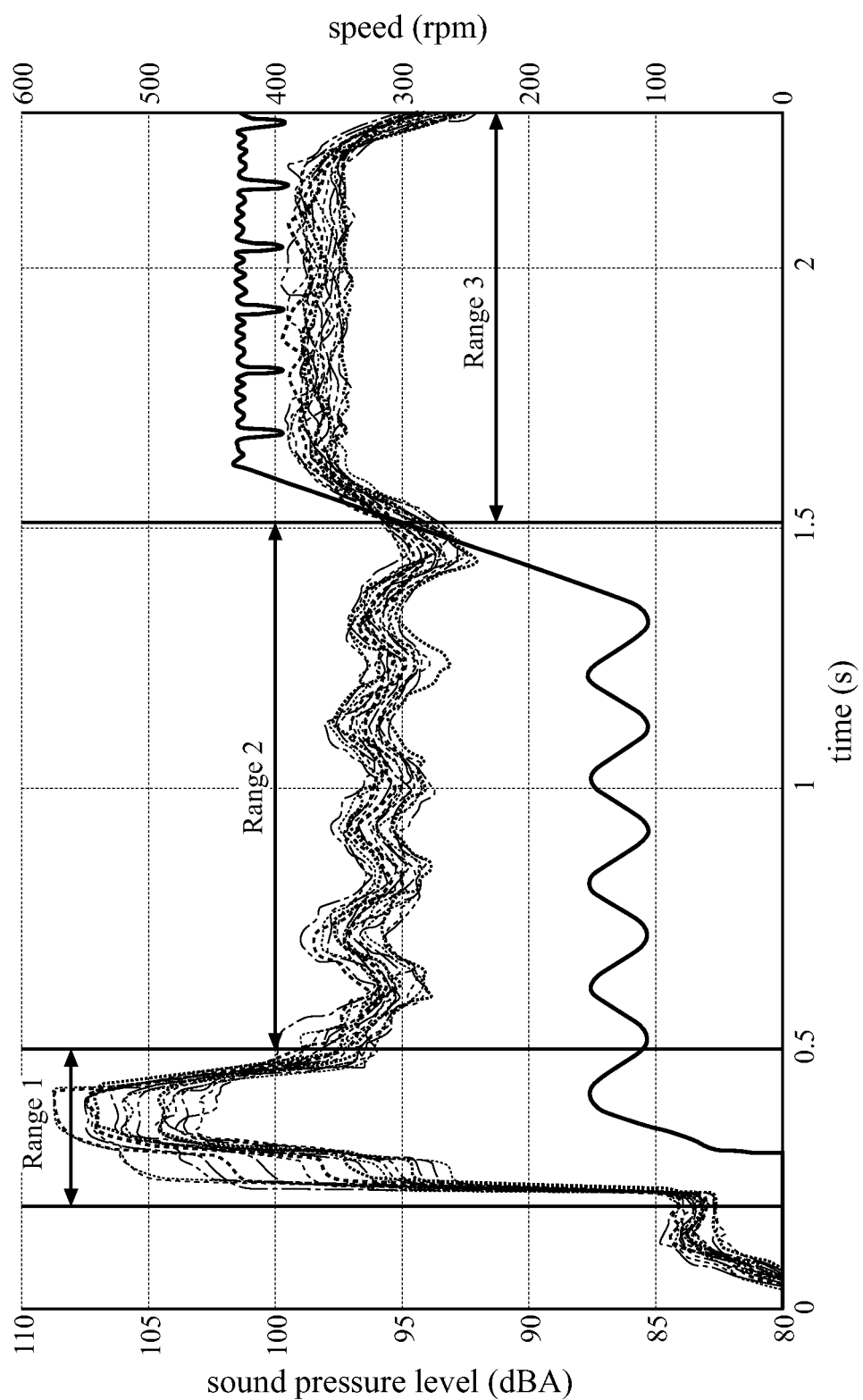
FIG. 14 is a graph illustrating noise emitted from a flexplate assembly according to an aspect of the disclosure.

The flexplate assemblies 20, 120 disclosed herein reduce noise as illustrated in FIGS. 13A and 13B which illustrate testing results of flex plate assemblies 20, 120 described as compared to other designs including those that do not utilize noise plates 50 (indicated as "No NP" in FIGS. 13A and 13B). In order to obtain such testing results, the sound pressure levels, in decibels are recorded during engagement of the gear teeth of the pinion gear with the ring teeth 30 of the ring gear 26 or computed in a simulation. As illustrated in FIG. 14, the highest sound pressure levels are typically during initial engagement of the gear teeth of the pinion gear with the ring teeth 30 of the ring gear 26 (indicated as "Range 1"), while lower noise levels may be expected while the starter drives continuously (indicated as "Range 2") and once the engine is running ("indicated as "Range 3"). The flexplate assembly 120 disclosed also advantageously provides for a design that uses fewer materials and reduces waste during manufacturing in comparison to previous techniques whereby the central plate 22 and/or ring gear 26 and noise plate 50 are blanked (e.g. stamped) separately. However, it should be appreciated that the central plate 22, ring gear 26, and noise plate 50 may alternatively be blanked or constructed separately.

Figure 15:
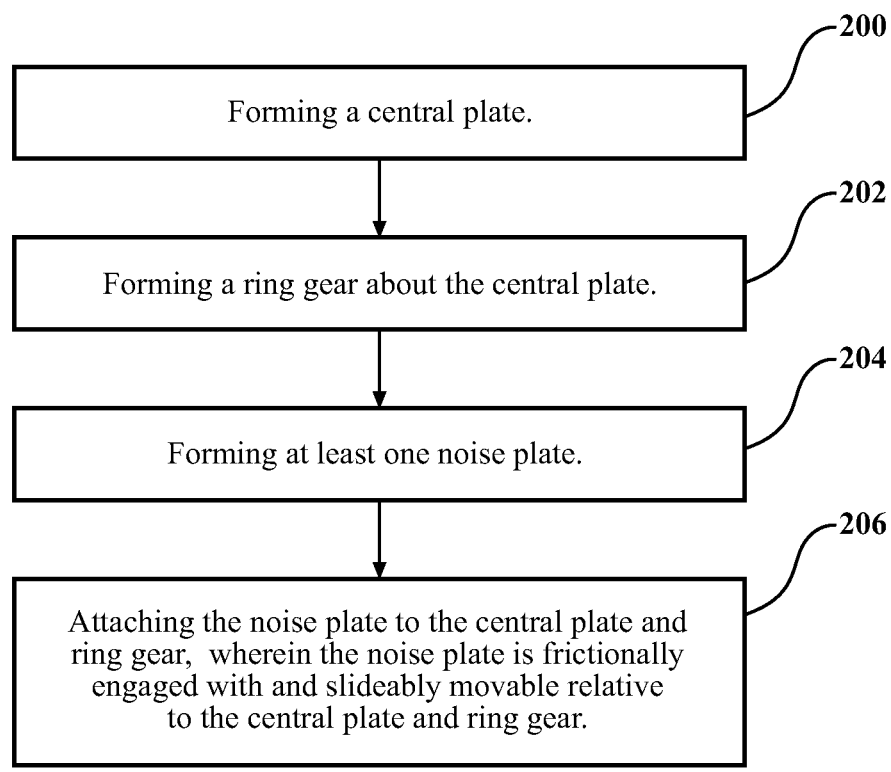
FIG. 15 is a flow chart illustrating the steps of constructing a flexplate assembly according to an aspect of the disclosure.

As illustrated by a flow chart in FIG. 15, a method of constructing a method of constructing a flexplate assembly 20, 120 is also disclosed. The method includes the step of 200 forming a central plate 22. The method proceeds by 202 forming a ring gear 26 about the central plate 22. As discussed above, the central plate 22 and ring gear 26 may originally begin as a one-piece flexplate which is separated and refastened. Consequently, the step of forming the ring gear 26 about the central plate 22 can include the steps of forming a ring gear 26 about the central plate 22, cutting the central plate 22 to form a plurality of first lugs 63 extending radially outwardly from the central plate 22 and a plurality of second lugs 64 extending radially inwardly from the ring gear 26, rotationally displacing the ring gear 26 and the central plate 22 to align the first lugs 63 and the second lugs 64, and securing the ring gear 26 to the central plate 22 at the lugs 63, 64. It should be understood that the ring gear 26 could be formed about the central plate 22 using other manufacturing techniques such as, but not limited to welding or casting. The next step of the method is 204 forming at least one noise plate 50. The noise plate 50 may be formed using any manufacturing technique such as, but not limited to stamping, molding, or casting. The method concludes with the step of 206 attaching the noise plate 50 to the central plate 22 and ring gear 26, wherein the noise plate 50 is frictionally engaged with and slideably moveable relative to the central plate 22 and ring gear 26. As disclosed above, the noise plate 50 can attached to the central plate 22 and/or ring gear 26 using various plate fasteners 61. Therefore, the method may include steps such as, but not limited to applying epoxy, welding, riveting, or bolting. According to an aspect, the step of 206 attaching the noise plate 50 to the central plate 22 and ring gear 26 is further defined as clinching the central plate 22 and noise plate 50 to form plate fasteners 61 (e.g. Tog-L-Loc®) spaced from one another and disposed circumferentially about the central plate 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Obviously, many modifications and variations of the present invention are possible in light of the above teachings and may be practiced otherwise than as specifically described while within the scope of the appended claims.

What is claimed is:

1. A flexplate assembly comprising;
    a central plate having a general disc shape disposed about and extending radially from an axis,
    a ring gear annularly secured about said central plate and presenting an outer circumference defining a plurality of ring teeth extending therefrom,
    a noise plate disposed adjacent to said central plate and extending circumferentially about said axis for reducing vibrations and noise from said flexplate assembly,
    said noise plate being frictionally engaged with and slideably moveable relative to said central plate to provide for noise and vibration reduction by converting friction between said noise plate and said central plate into heat, and
    an additional damping material disposed between said noise plate and at least one of said central plate and said ring gear to provide for additional noise and vibration reduction,
    wherein said noise plate includes a flange and a lower lip extending generally axially and radially outwardly from said flange and said additional damping material being disposed between said lower lip of said noise plate and said outer circumference of said rind gear.

2. The flexplate assembly of claim 1, further including a plurality of plate fasteners spaced from one another and disposed circumferentially about said axis to attach said noise plate to said central plate.

3. The flexplate assembly of claim 2, wherein said plurality of plate fasteners each comprising a clinched area.

4. The flexplate assembly of claim 2, wherein said plate fasteners include at least one of the following: epoxy, weld, rivet, screw, and bolt.

5. The flexplate assembly of claim 1, wherein said noise plate further includes tabs extending from the noise plate toward at least one of said central plate and said ring gear to provide spring-like compressive forces for increased friction to heat conversion and to provide for additional impact cushioning and compliance.

6. The flexplate assembly of claim 1, wherein said noise plate is preshaped and provides spring-like compressive force on at least one of said central plate and said ring gear once assembled with said central plate and said ring gear.

7. The flexplate assembly of claim 1, wherein said central plate presents a top surface and a bottom surface and said noise plate comprises at least one noise plate disposed adjacent said top surface and at least one noise plate is disposed adjacent said bottom surface.

8. The flexplate assembly of claim 1, wherein said noise plate comprises a plurality of noise plates disposed adjacent one another and adjacent one of said top surface and said bottom surface.

9. The flexplate assembly of claim 8, further including a damping material disposed between each of said plurality of noise plates.

10. The flexplate assembly of claim 1, wherein said central plate extends radially from an inner portion having a generally stepped cross-section to an intermediate portion stepped axially from said inner portion to an outer portion.

11. The flexplate assembly of claim 10, wherein said central plate defines a plurality of slots disposed circumferentially about said intermediate portion for providing flexibility and reducing weight of said central plate.

12. The flexplate assembly of claim 1, wherein said flange and said lower lip extends generally axially and radially outwardly from said flange to a maximum deflection zone adjacent said ring teeth of said ring gear.

13. The flexplate assembly of claim 12, wherein said noise plate further includes an upper lip extending generally axially away from and radially inwardly from said flange toward said axis.

14. The flexplate assembly of claim 1, wherein at least one of said noise plate and said central plate and said ring gear includes a surface treatment in order to alter the friction coefficient between said noise plate and said central plate and said ring gear.

15. The flexplate assembly of claim 2, wherein said central plate defines a plurality of apertures.

16. The flexplate assembly of claim 15, wherein said noise plate defines a plurality of noise plate apertures and each of said noise plate apertures being larger than and superimposed over said plurality of apertures defined by said central plate.

17. The flexplate assembly of claim 16, wherein said plurality of fasteners includes a plurality of inserts extending through and in a frictional relationship with said plurality of apertures defined by said central plate and extending through and in a spaced relationship to said plurality of noise plate apertures.

18. The flexplate assembly of claim 1, wherein said central portion defines a central opening extending about said axis and said noise plate defines a middle opening extending about said axis and a hub of a crankshaft extends through and being in a fixed relationship with said central opening and extends through and being in a spaced relationship with said middle opening.

* * * * *